United States Patent
French et al.

(10) Patent No.: US 8,933,933 B2
(45) Date of Patent: Jan. 13, 2015

(54) OPTIMIZING A GRAPHICS RENDERING PIPELINE USING EARLY Z-MODE

(75) Inventors: Mark J. French, Raleigh, NC (US); Emmett M. Kilgariff, San Jose, CA (US); Steven E. Molnar, Chapel Hill, NC (US); Walter R. Steiner, Flagler Beach, FL (US); Douglas A. Voorhies, Menlo Park, CA (US); Adam Clark Weitkemper, Morrisville, NC (US)

(73) Assignee: NVIDIA Corporation, Santa Clara, CA (US)

(*) Notice: Subject to any disclaimer, the term of this patent is extended or adjusted under 35 U.S.C. 154(b) by 1375 days.

(21) Appl. No.: 11/430,635

(22) Filed: May 8, 2006

(65) Prior Publication Data

US 2007/0257905 A1    Nov. 8, 2007

(51) Int. Cl.
*G06T 15/40* (2011.01)
*G06T 15/00* (2011.01)

(52) U.S. Cl.
CPC ............ *G06T 15/405* (2013.01); *G06T 15/005* (2013.01)
USPC .......................................... 345/422; 345/419

(58) Field of Classification Search
None
See application file for complete search history.

(56) References Cited

U.S. PATENT DOCUMENTS

| | | | |
|---|---|---|---|
| 5,798,770 A * | 8/1998 | Baldwin | 345/506 |
| 6,222,550 B1 | 4/2001 | Rosman et al. | |
| 6,734,861 B1 * | 5/2004 | Van Dyke et al. | 345/506 |
| 6,961,065 B2 | 11/2005 | Sasaki | |
| 6,999,076 B2 * | 2/2006 | Morein | 345/422 |
| 7,034,828 B1 | 4/2006 | Drebin et al. | |
| 7,068,272 B1 | 6/2006 | Voorhies et al. | |
| 7,633,506 B1 | 12/2009 | Leather et al. | |
| 8,207,975 B1 * | 6/2012 | Molnar et al. | 345/506 |
| 2003/0080959 A1 * | 5/2003 | Morein | 345/422 |
| 2004/0061699 A1 * | 4/2004 | Tjew | 345/421 |
| 2004/0119710 A1 | 6/2004 | Piazza et al. | |
| 2004/0246260 A1 | 12/2004 | Kim et al. | |
| 2005/0140684 A1 | 6/2005 | Buehler | |
| 2005/0195198 A1 | 9/2005 | Anderson et al. | |

(Continued)

FOREIGN PATENT DOCUMENTS

| JP | 09-050533 | 2/1997 |
|---|---|---|
| JP | 2002-269583 | 9/2002 |

OTHER PUBLICATIONS

Victor Moya, Carlos Gonzalez, Jordi Roca, Agustin Fernandez, Roger Espasa, "Shader Performance Analysis on a Modern GPU Architecture," Nov. 16, 2005, Proceedings of the 38th Annual IEEE/ACM International Symposium on Microarchitecture (MICRO'05), pp. 355-364.*

(Continued)

*Primary Examiner* — James A Thompson
(74) *Attorney, Agent, or Firm* — Patterson & Sheridan, LLP (57) ABSTRACT

One embodiment of the present invention sets forth an architecture for advancing the Z-test operation prior to pixel shading whenever possible. The current rendering state, as maintained by the setup engine, determines whether advancing the Z-test function above the shader engine for "early" Z-testing is possible or whether the Z-test function should be deferred until after shading operations for "late" Z-testing. Data is dynamically routed to each processing engine in the pipeline, so that the appropriate data flow for either early Z or late Z is dynamically constructed, as determined by the current rendering state. The same functional units are utilized in both early Z and late Z configurations.

20 Claims, 6 Drawing Sheets

(56) References Cited

U.S. PATENT DOCUMENTS

2005/0280652 A1    12/2005   Hutchins et al.
2007/0236495 A1*  10/2007   Gruber et al. ............. 345/422
2007/0257905 A1*  11/2007   French et al. ............. 345/419
2007/0268289 A1    11/2007   Yu et al.

OTHER PUBLICATIONS

Eggers, et al. "Simultaneous Multithreading: A Platform for Next-Generation Processors," IEEE Micro, vol. 17, No. 5, pp. 12-19, Sep./Oct. 1997.

English Translation of JP 2002-269583 (provided as explanation of relevance).

English Translation of JP 09-050533 (provided as explanation of relevance).

Partial Translation of Office Action, JP App. No. 2007-123715, dated Dec. 28, 2009.

Fernando, Randima, "GPU Gems," Chapter 28, NVIDIA Corp., 2004.

Office Action, U.S. Appl. No. 11/959,441, dated Mar. 25, 2011.

* cited by examiner

OPTIMIZING A GRAPHICS RENDERING PIPELINE USING EARLY Z-MODE

BACKGROUND OF THE INVENTION

1. Field of the Invention

Embodiments of the present invention relate generally to computer graphics and more specifically to optimizing a graphics rendering pipeline using early Z-mode.

2. Description of the Related Art

A graphics rendering engine commonly consists of a set of specialized processing engines organized in a dataflow-style pipeline. After any data fetch engines, the setup engine is commonly at the top of the graphics rendering engine. The setup engine operates on geometric primitives, such as triangles, and emits transformed or simplified representations of the geometric primitives to a raster engine. The raster engine determines pixel coverage associated with each geometric primitive, producing a sequential stream of unshaded pixel primitives. A shader engine operates on the sequential stream of unshaded pixels from the raster engine, producing a stream of shaded pixels. In addition to computing the color of a given pixel, some shader engines optionally operate on the depth (Z-value) and stencil attributes of a pixel. Pixel depth and stencil values are computed by a Z-raster operations (ZROP) engine when not computed by the shader engine. A Z-resolve engine determines if a new pixel should be saved or discarded through an operation called Z-testing. Z-testing compares a new pixel's depth and stencil data against previously stored depth and stencil data in the current depth buffer at the location of the new pixel. If Z-testing determines the new pixel is to be saved, the Z-resolve engine writes the new pixel's depth and stencil data to the current depth buffer. The Z-resolve engine then informs a color raster operations (CROP) engine to write the new pixel's color data to the current image buffer.

The precise sequence of processing steps in a graphics rendering pipeline is commonly designed to accommodate the simplest reduction of sequential data dependence in the rendering process. For example, a triangle primitive should be rasterized into a pixel primitive before pixel operations are conducted on the set of pixels covered by the triangle. Additionally, a pixel's Z-value should be computed before being compared to previously computed Z-values in the depth buffer. Z-testing is commonly conducted after shading, giving the shader engine an opportunity to conclude any depth or stencil computations prior to Z-testing.

As is well known, the shader engine is the most expensive element of the graphics rendering pipeline, consuming the most logic resources and the most power. Furthermore, complex shading algorithms commonly executed in the shader engine cause the shader engine to become the leading performance bottleneck in the graphics rendering pipeline. Early Z-culling in the raster engine achieves some performance gain by discarding primitives known to be occluded before work related to these primitives is triggered within the shader engine. However, early Z-culling is only a trivial discard mechanism and not a substitute for the more precise Z-testing. Even when early Z-culling is employed, the Z-testing step may discard up to half of the pixels processed by the shader engine. More importantly, the shader engine does not even modify the Z-values of many of the discarded pixels during shading operations, making the traversal of these pixels through the shader engine superfluous. Thus, a consequence of standard architectures is that the shader engine, the single most expensive resource in a graphics rendering pipeline, operates at a substantially inefficient level.

As the foregoing illustrates, what is needed in the art is a technique for improving shader engine efficiency in a graphics rendering pipeline.

SUMMARY OF THE INVENTION

One embodiment of the present invention sets forth a configurable graphics rendering pipeline for processing graphics primitives. The graphics rendering pipeline includes a setup engine configured to determine whether processing should proceed in early Z-mode or late Z-mode, a raster engine configured to receive a geometry primitive from the setup engine and convert the geometry primitive into at least one pixel primitive, a shader engine configured to perform shading operations on pixels associated with the at least one pixel primitive, a Z-raster operations (ZROP) unit configured to compute Z-data for each of the pixels, a Z-resolve engine configured to determine, for each pixel, whether the pixel is to be kept or discarded based on the Z-data associated with the pixel, and a pre-raster operations (PROP) unit configured to modify a data flow path between the shader engine and the ZROP unit to support both early Z-mode and late Z-mode. When the graphics rendering pipeline is configured for early Z-mode, the pixels associated with the at least one pixel primitive are processed first by the ZROP unit and the Z-resolve engine and then by the shader engine. When the graphics rendering pipeline is configured for late Z-mode, the pixels are processed first by the shader engine and then by the ZROP unit and the Z-resolve engine.

One advantage of the disclosed graphics rendering pipeline is that, under appropriate circumstances, Z-testing can be implemented before pixels are transmitted to the shader engine, thereby increasing the processing efficiency of the shader engine relative to prior art architectures.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

The present invention improves the overall efficiency of a graphics rendering pipeline by reducing the workload on the shader engine, a well-known performance bottleneck of most graphics rendering pipelines. By dynamically reconfiguring the graphics rendering pipeline to permit early Z-testing in certain situations, allowing occluded pixels to be discarded before shading, the shader engine is relieved of superfluous work common in traditional graphics rendering pipelines.

Figure 1:
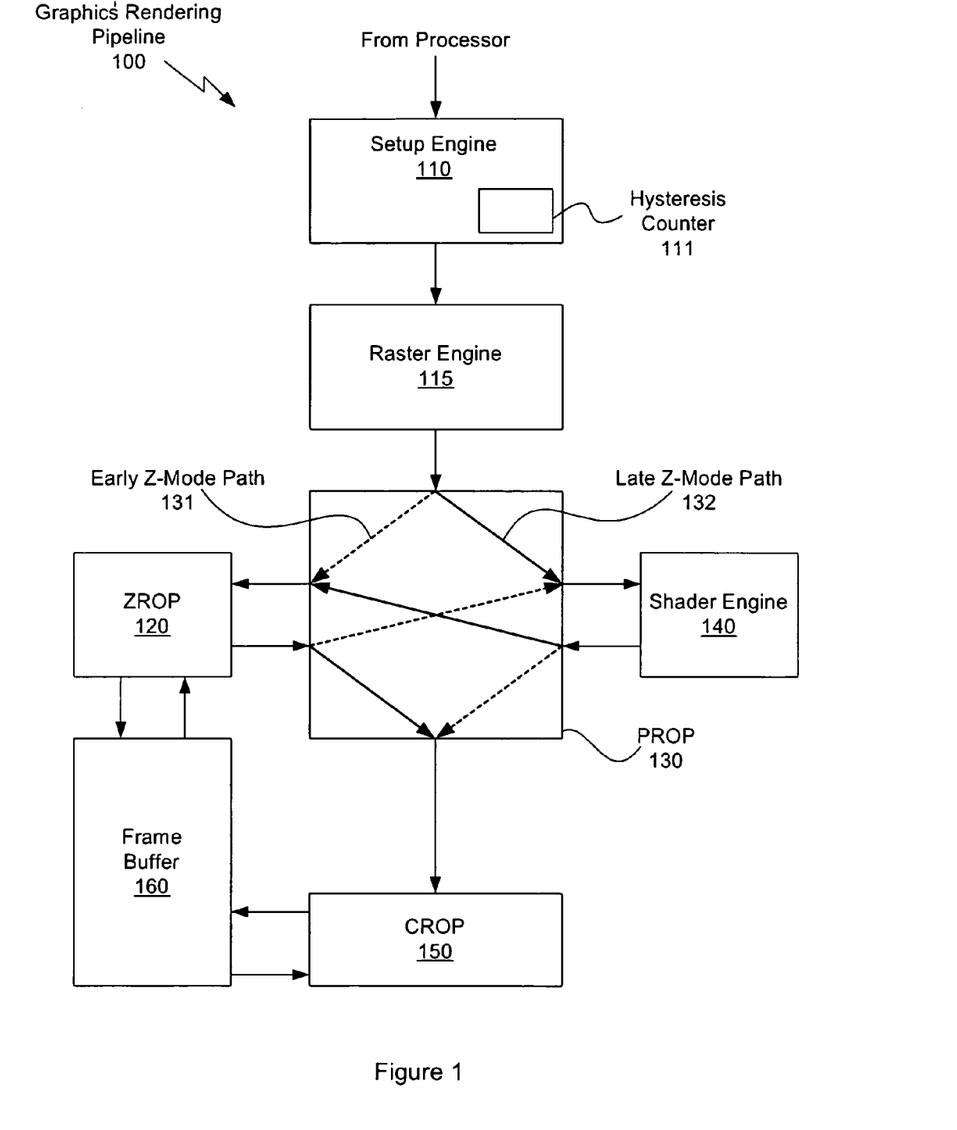
FIG. 1 is a conceptual diagram of data flow through a graphics rendering pipeline, according to one embodiment of the invention.

FIG. 1 is a conceptual diagram of data flow through a graphics rendering pipeline 100, according to one embodiment of the invention. As shown, a setup engine 110 receives geometric primitives from a driver executing on a processor (not shown). The setup engine 110 operates on incoming primitives and emits transformed and processed geometric primitives suitable for presentation to a raster engine 115. The setup engine 110 also operates on incoming commands containing "state bundles." State bundles contain data that defines, without limitation, how subsequent graphics primitives are to be processed in the various processing units of the graphics rendering pipeline 100. Data from a state bundle may be retained in those processing units for later reference. The setup engine 110 tracks the rendering state in the graphics rendering pipeline 100 and coordinates certain changes therein. The rendering state includes, without limitation, the different variables, modes and settings associated with the rendering process at various points within the graphics rendering pipeline 100. Some rendering state variables, modes or settings are established prior to initiating the rendering process on a given primitive, whereas some rendering state is dynamically updated as the primitive progress through the graphics rendering pipeline 100. As described in greater detail below, a hysteresis count is one element of the rendering state managed within the setup engine 110. The hysteresis count is maintained in a hysteresis counter 111.

The raster engine 115 computes the coverage of the geometric primitives and emits pixel primitives for further processing.

The depth value and stencil data associated with a pixel are used to determine pixel visibility. The combination of depth value and stencil data is referred to herein as "Z-data." A Z raster operations unit (ZROP) 120 computes Z-data for the pixel primitives, and the results from ZROP 120 are used by a Z-resolve engine 125 to determine if the various pixels of the pixel primitives are to be kept or discarded. More specifically, the Z-resolve engine 125 compares each current pixel's Z-data with the Z-data corresponding to that pixel previously stored in a depth buffer (not shown). Based on this comparison, the Z-resolve engine 125 determines if the current pixel is visible or occluded. Again, the process is known as "Z-testing." If a pixel is visible, then the pixel is kept and the Z-resolve engine 125 writes the pixel's Z-data to the depth buffer, which commonly resides in a frame buffer 160. If the pixel is not visible, then the Z-data is discarded. The combined process implemented by ZROP 120 and Z-resolve 125 is well known to persons skilled in the art.

The shader engine 140 operates on the pixel primitives to compute, without limitation, color and Z-data for the pixels, as determined by the programming of the shader engine 140. As previously described, in many instances, the Z-data is not altered by the shader engine 140. A color raster operations unit (CROP) 150 conditionally writes, as determined by the Z-resolve engine 125, the pixel's color value to the frame buffer 160.

A pre-raster operations (PROP) 130 unit manages the flow of pixel primitives between ZROP 120, CROP 150 and the shader engine 140, sequencing the order of operations in accordance with the current rendering state of each pixel primitive. As described herein, PROP 130 operates in one of two modes, "early" Z-mode and "late" Z-mode.

A data flow path 132 for late Z-mode is shown in solid lines running through PROP 130. In late Z-mode, the shader engine 140 first operates on a pixel primitive to calculate, without limitation, color and Z-data for the related pixels. The shader engine 140 directs the results to ZROP 120 for any remaining Z-data operations. The Z-resolve engine 125 conducts Z-testing, as described above, on the resulting Z-data. The results are then transmitted back through ZROP 120 to CROP 150 for any remaining color and frame buffer updates.

A data flow path 131 for early Z-mode is shown in dashed lines running through PROP 130. In early Z-mode, Z-test is conducted before shading, relieving the shader engine 140 from the superfluous work associated with pixels destined to be discarded anyway. Thus, in early Z-mode, pixel primitives from the raster engine 115 are routed first to ZROP 120 for Z-data operations, then to Z-resolve engine 125 for Z-testing, then back to the shader engine 140, through ZROP 120, for shading operations, and finally to CROP 150.

Whether the graphics rendering pipeline 100 is in early Z-mode or in late Z-mode, Z-testing is generally required on all pixels. In the case of early Z-mode, the shader engine 140 is relieved of the computation associated with pixels that are discarded on account of Z-testing, resulting in improved system performance. In the case of late Z-mode, the shader engine 140 shades all pixels regardless of the ultimate disposition of each pixel. Late Z-mode is the general case and accommodates all rendering states available in the graphics rendering pipeline 100; whereas, early Z-mode is restricted to certain frequently encountered rendering states and is implemented opportunistically when eligible primitives are to be rendered.

Figure 2:
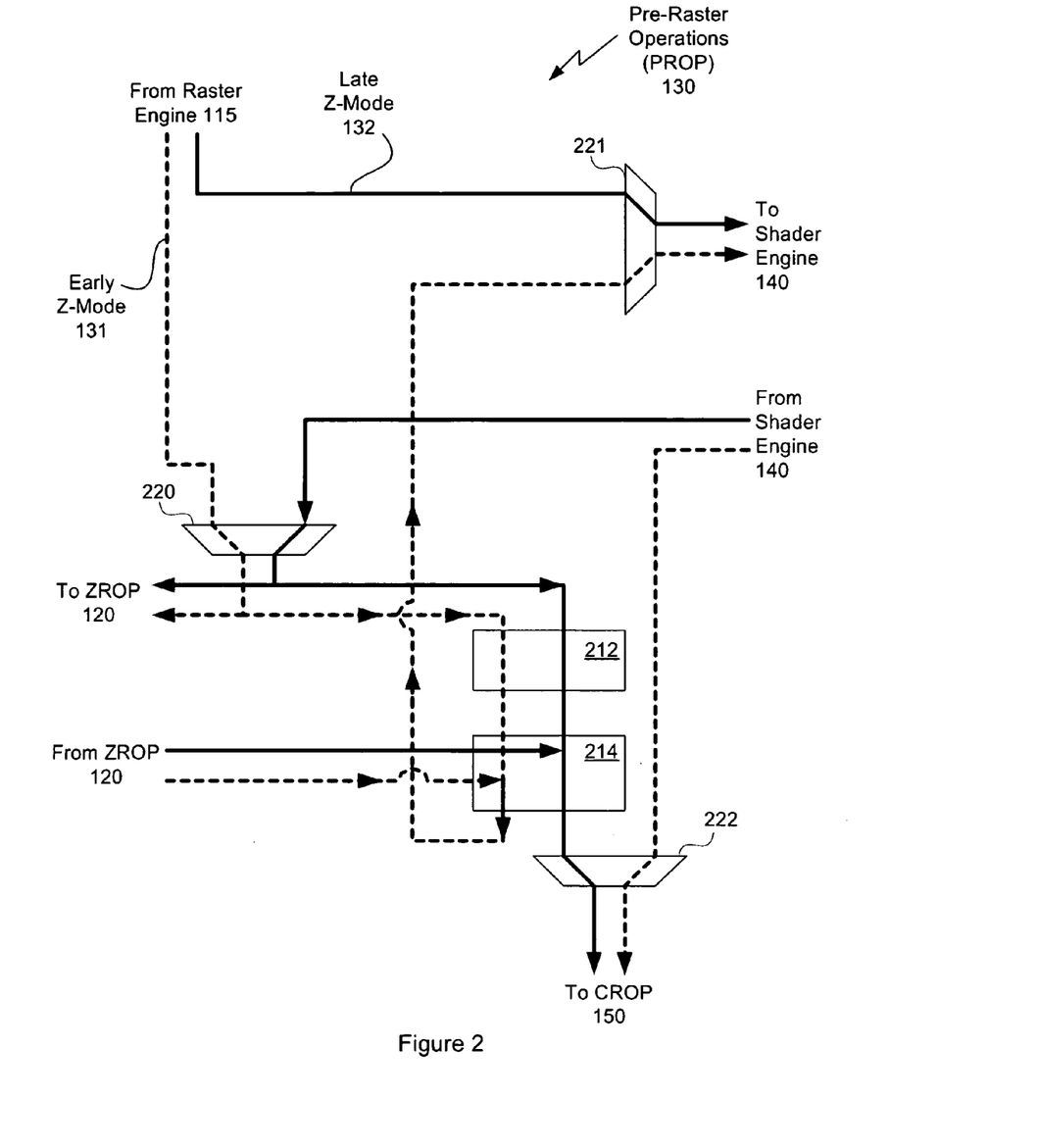
FIG. 2 is a conceptual diagram of data flow through the PROP of FIG. 1, according to one embodiment of the invention.

FIG. 2 is a conceptual diagram of data flow through PROP 130 of FIG. 1, according to one embodiment of the invention. The data flow path 132 for late Z-mode is shown in solid lines. In late Z-mode, PROP 130 routes pixel data from the raster engine 115 through a multiplexer 221 to the shader engine 140. Additionally, pixel data form the raster engine 115 is sent through a latency buffer 210 to accommodate the variable latency potentially exhibited by the shader engine 140. A first resolve unit 211 merges the return data from the shader engine 140 with data buffered in the latency buffer 210 to produce a stream of pixel data, which is then sent through a multiplexer 220. The output of multiplexer 220 is routed to ZROP 120 for Z-data processing, including Z-test, and to a second latency buffer 212 to accommodate the variable latency potentially exhibited by the combined ZROP 120 and Z-resolve 125 units. A second resolve unit 214 merges the results of ZROP 120 with data in the second latency buffer 212 to produce a shaded pixel. This shaded pixel is then selected by a multiplexer 222 and emitted to CROP 150 for final color processing, before being written to the frame buffer 160.

As with FIG. 1, the data flow path 131 for early Z-mode is shown in dashed lines. In early Z-mode, PROP 130 is configured to pass data from the raster engine 115 directly to multiplexer 220, skipping the first latency buffer 210 and first resolve unit 211. Data emitted by multiplexer 220 is routed to ZROP 120 and to the second latency buffer 212 to accommodate the variable latency potentially exhibited by the combined ZROP 120 and Z-resolve 125 units. Again, Z-data processing occurs within ZROP 120, and Z-testing occurs within the Z-resolve engine 125. The second resolve unit 214 merges the results of ZROP 120 with data in the second latency buffer 212 to produce pixels that have survived the Z-test. Pixels surviving the Z-test are routed from the second resolve unit 214 to the shader engine 140 for shading. Shaded pixels are then routed from the shader engine 140 through the third multiplexer 222 to CROP 150 for final color processing before being written to the frame buffer 160.

Early Z-mode is the preferred, higher performance operating mode for the graphics rendering pipeline 100. The setup engine 110 determines whether the graphics rendering pipeline 100 can operate in early Z-mode or whether the graphics rendering pipeline 100 should operate in late Z-mode. In general, early Z-mode is used if the current rendering state indicates that the Z-data associated with a primitive is not going to be altered by the shader engine 140. As previously noted, all rendering operations are supported in late Z-mode. However, as set forth below, early Z-mode may be implemented when certain specific rendering modes are encountered.

There is one rendering state that generally precludes early Z-mode operation. That rendering state is established whenever shader programs compute or modify Z-data internally, evidenced in the following pseudo code when DepthReplaceShader==true. Within the sets of other possible rendering states, there are two regimes in which early Z-mode is allowed; the first is defined as "EarlyZClassic," in which shader and post-shader color operations do not affect fragment coverage. The second regime in which early Z-mode is allowed is defined as "EarlyZNoUpdate," in which Z-data writes are disabled, so that Z-testing can be moved before shading in the graphics rendering pipeline 100, as shown in data flow path 131. As described in greater detail below, the hysteresis counter 111 should reach a specific count before a switch over to early Z-mode occurs. The following pseudo code summarizes the conditions that should be met before early Z-mode is enabled:

```
EarlyZGlobalOK =
    DepthReplaceShader        == false;  // shader does not
                                         compute or modify Z
EarlyZClassicOK =                        // shader does not affect fragment
                                         coverage
    AlphaTestEnable           == false &&
    AlphaToCovgEnable         == false &&
    ShaderPixelKillEnable     == false &&
    TextureColorKeyEnable     == false;
EarlyZNoUpdateOK =                       // Z results not stored
    (DepthTestEnable          == false ||
    DepthWriteEnable          == false) &&
    (StencilTestEnable        == false ||
    (StencilMask              == 0x0);
EarlyZEnable =                           // rendering state criteria met to switch to
                                         early Z-mode
    EarlyZGlobalOK &&
    (EarlyZClassicOK || EarlyZNoUpdateOK) &&
    (EarlyZHysteresisFSM.AllowEarlyZ == true);
EarlyZOkayPrimitive =        // primitive is compatible with early Z-mode
                             processing
    EarlyZGlobalOK &&
    (EarlyZClassicOK || EarlyZNoUpdateOK);
```

Thus, if the above pseudo code yields a true condition in the EarlyZEnable variable, then the setup engine 110 can instruct PROP 130 to switch the graphics rendering pipeline 100 to operate in early Z-mode once the graphics rendering pipeline 100 has completed the in-progress work in late Z-mode. As previously described, EarlyZEnable is true when the shader engine 140 does not modify or compute Z-data (DepthReplaceShader==false), the graphics rendering pipeline 100 is in one of two specific rendering modes (EarlyZClassicOK==true or EarlyZNoUpdate==true) and the hysteresis counter 111 is in a state to allow a transition to early Z-mode (EarlyZHysteresisFSM.AllowEarlyZ==true). The definition of each of the above-listed rendering state variables is set forth below. These rendering state variables and their respective functions are readily recognized and understood by persons skilled in the art.

DepthReplaceShader: The shader engine computes or modifies Z values (as opposed to interpolating vertex Z values normally);

AlphaTestEnable: The fragment alpha value is compared against a reference value, killing the pixel if the designated condition is not met;

AlphaToCovgEnable: The fragment alpha is converted into a sample coverage mask that is ANDed with the coverage mask computed by the raster engine;

ShaderPixelKillEnable: The fragment shader may kill fragments;

TextureColorKeyEnable: A color key comparison of texture values with a reference may kill fragments;

DepthTestEnable: Depth testing (Z buffering) is enabled;

DepthWriteEnable: Depth values that pass the depth test are written to memory;

StencilTestEnable: Stencil testing is enabled; and,

StencilMask: Bit mask indicating which stencil bits may be written to memory.

When switching from late Z-mode to early Z-mode or from early Z-mode to late Z-mode, there are two potential problems. First, if there is primitive data still in the graphics rendering pipeline 100, then switching modes may result in lost or inaccurate pixel data or decreased processing efficiency. For example, switching to early Z-mode with late Z-mode primitives still in the graphics rendering pipeline 100 may result in premature Z-testing, which may then result in either lost or inaccurate pixel data because Z-testing may not be based on the final Z-data. On the other hand, switching to late Z-mode with early Z-mode primitives still in the graphics rendering pipeline 100 may result in processing inefficiencies since pixels that otherwise would have been discarding during early Z-testing may wind up being processed by the shader engine 140. To overcome the problems associated with switching modes while primitive data is still in the graphics rendering pipeline 100, a "flush" is executed on the graphics rendering pipeline 100 prior to switching modes. Pipeline flush techniques are well known in the art and may be implemented in any technically feasible fashion. Executing a flush allows the in-progress work in the graphics rendering pipeline 100 to drain through to some predetermined level of completion prior to switching modes. However, when executing a flush, a span of pipeline inactivity called a "bubble" is commonly introduced behind the draining workload. Such bubbles detract from overall performance because potential computation cycles are effectively idle. Thus, the second problem with switching modes is that the performance penalty associated with flushing the graphics rendering pipeline 100 may decrease overall performance if flushes are executed too frequently. To solve this second problem, the rate at which the graphics rendering pipeline 100 is permitted to switch modes is controlled using a rate limiting hysteresis mechanism.

The hysteresis counter 111 tracks the number of primitives presented to the setup engine 110, and when a threshold number of such primitives has been detected, the setup engine 110 may initiate a switch from late Z-mode to early Z-mode. More specifically, because late Z-mode generally accommodates all of the rendering states permitted in the graphics rendering pipeline 100, late Z-mode is recognized as the default operating mode. When operating in late Z-mode and EarlyZEnable becomes true, the setup engine 110 opportunistically initiates a mode switch of the graphics rendering pipeline 100 to early Z-mode, subject to executing a flush and provided that the setup engine 110 has encountered the threshold number of primitives. Thus, the graphics rendering pipeline 100 is held in late Z-mode for the duration of a minimum number of primitives before switching to early Z-mode is enabled, thereby reducing the rate of mode switching.

In one embodiment, the hysteresis counter 111 is programmed with a count value set forth in a state bundle that is transmitted to the setup engine 110 and made available to the hysteresis counter 111. The hysteresis count, which is maintained by the hysteresis counter 111, is set to the count value whenever the setup engine 110 initiates a mode change to late Z-mode (or when the graphics rendering pipeline 100 is initially configured for late Z-mode). Upon setting the hysteresis count to the count value, the hysteresis count is advanced, such as through a decrement or increment operation, each time a primitive is received into the setup engine 110. This process continues until the hysteresis count reaches a trigger value, such as zero. The hysteresis count reaching the trigger value indicates that a predetermined threshold number of primitives has been presented to the setup engine 110, which will have held the graphics rendering pipeline 100 in late Z-mode for processing that minimum threshold number of primitives. At such time, the setup engine 110 may initiate a mode change in the graphics rendering pipeline 100 to early Z-mode, if doing so is appropriate (i.e., EarlyZOkayPrimitive is true, indicating all rendering process steps are compatible with early Z-mode rendering).

When operating in early Z-mode, if a new rendering state is incompatible with early Z-mode, the setup engine 110 transitions the graphics rendering pipeline 100 back to late Z-mode by first executing a flush and subsequently instructing the PROP 130 to modify the data flow path, as described above. In such a situation, the setup engine 110 is generally not to subject to the constraint that a threshold number of primitives have been presented to the setup engine 110. However, persons skilled in the art will recognize that other embodiments may implement the hysteresis mechanism when switching from early Z-mode to late Z-mode as well.

In addition to the above behavior, the hysteresis counter 111 may be configured to operate in several different modes, including, but not limited to, modes that force the graphics rendering pipeline 100 to always operate in late Z-mode or always allow the graphics rendering pipeline 100 to switch modes regardless of hysteresis count value. Additionally, the hysteresis counter 111 may respond to certain reset conditions, causing the hysteresis count to be set, for example, to the count value, as described above.

Figure 3:
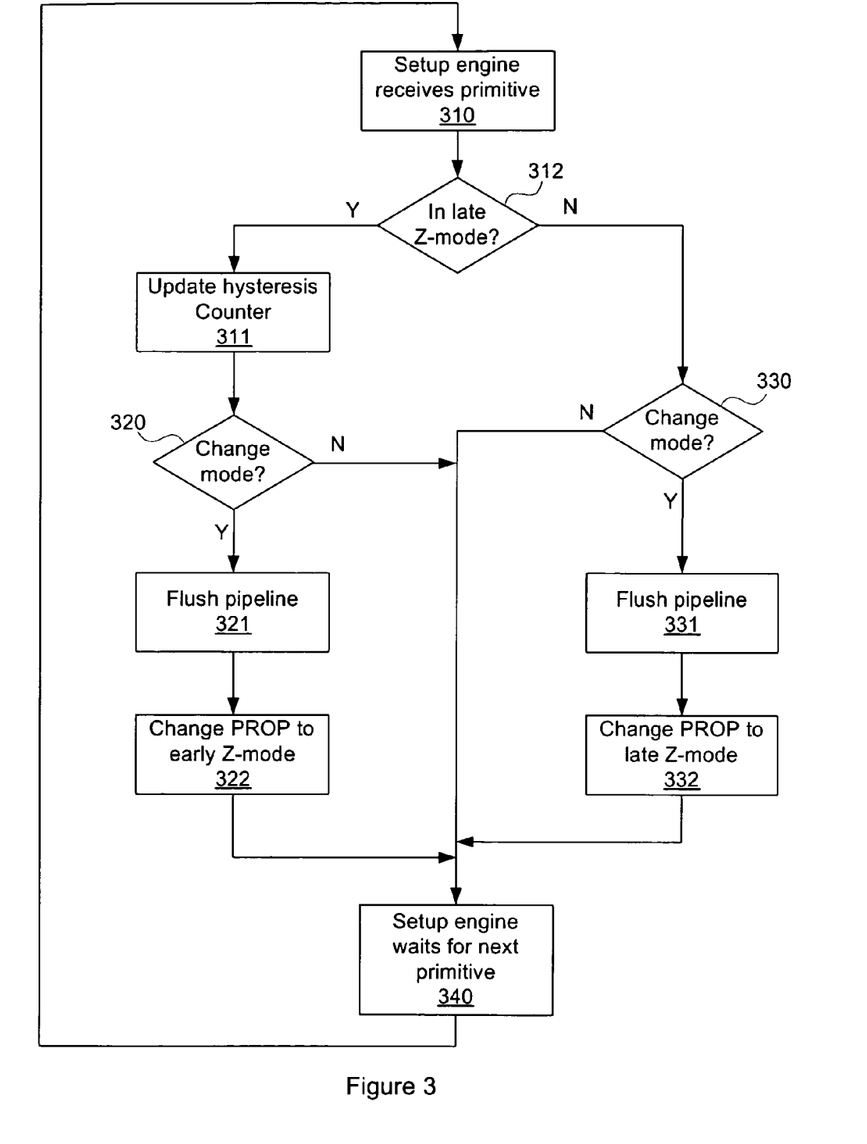
FIG. 3 is a flow diagram of method steps for switching operating modes in the graphics rendering pipeline of FIG. 1, according to one embodiment of the invention.

FIG. 3 is a flow diagram of method steps for switching operating modes in the graphics rendering pipeline 100 of FIG. 1, according to one embodiment of the invention. Although the method steps are described in conjunction with FIGS. 1, 2, 4A and 4B, persons skilled in the art will understand that any system that performs the method steps, in any order, is within the scope of the invention.

The method of switching operating modes begins in step 310, where the setup engine 110 receives a primitive upon which to operate. In step 312, the setup engine 110 determines whether the current operating mode is early Z-mode or late Z-mode. If the current operating mode is late Z-mode, then the method proceeds to step 311, where the hysteresis count is updated. As described above, the hysteresis count is set to a count value set forth in a state bundle that is transmitted to the setup engine 110 either when entering late Z-mode or when the graphics rendering pipeline 100 is initially configured for late Z-mode. During late Z-mode operation, the hysteresis count is advanced, such as through an increment or decrement operation, each time the setup engine 110 receives a new primitive. After updating the hysteresis counter 111, the method proceeds to step 320, where the setup engine 110 determines if a mode change should occur, as indicated by the rendering state variable EarlyZEnable being true. If EarlyZEnable is false, then a mode change should not occur, and the method proceeds to step 340, where the setup engine 110 waits for the next primitive in the primitive stream. If, however, EarlyZEnable is true, then a mode change should occur, and the method proceeds to step 321. In step 321, the setup engine 100 initiates a flush operation to flush the graphics rendering pipeline 100 to allow the completion of in-progress work. The method then proceeds to step 322, where the setup engine 110 instructs PROP 130 to reconfigure the data flow of the graphics rendering pipeline 100 for early Z-mode operation, as illustrated in FIG. 2. Once step 322 is completed, the graphics rendering pipeline 100 is configured for early Z-mode and the method proceeds to step 340, where the setup engine waits for the next primitive in the primitive stream. The method then returns to step 310.

Referring back to step 312, if the current operating mode is early Z-mode, then the method proceeds to step 330, wherein the setup engine 110 determines if a mode change should occur based on the next primitive to be processed. If the next primitive should be processed in early Z-mode, as indicated by the rendering state variable EarlyZOkayPrimitive, then no mode change needs to occur and the method proceeds to step 340. On the other hand, if the next primitive should be processed in late Z-mode, then a mode change needs to occur and the method proceeds to step 331. In step 331, the setup engine 100 initiates a flush operation to flush the graphics rendering pipeline 100 to allow the completion of in-progress work. The method then proceeds to step 332, where the setup engine 110 instructs PROP 130 to reconfigure the data flow of the graphics rendering pipeline 100 for late Z-mode operation, as illustrated in FIG. 2. Once step 332 is completed, the graphics rendering pipeline 100 is configured for late Z-mode and the method proceeds to step 340, where the setup engine waits for the next primitive in the primitive stream. The method then returns to step 310.

Figure 4A:
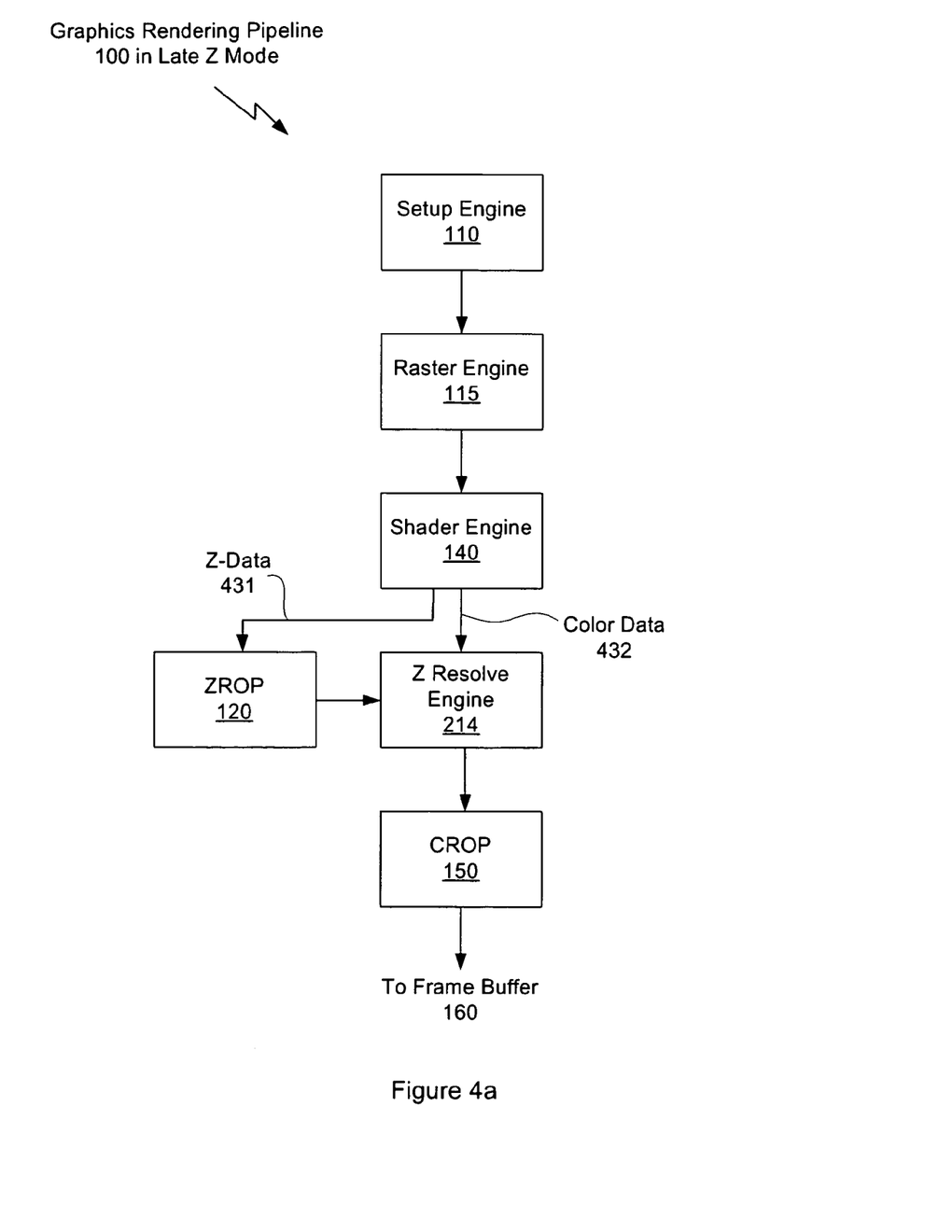
FIG. 4a illustrates the logical configuration of the graphics rendering pipeline of FIG. 1 when operating in late Z-mode, according to one embodiment of the invention.

FIG. 4a illustrates the logical configuration of the graphics rendering pipeline 100 of FIG. 1 when operating in late Z-mode, according to one embodiment of the invention. The setup engine 110 operates on incoming primitives and emits transformed and processed geometric primitives suitable for presentation to the raster engine 115. The raster engine 115 computes the coverage of geometric primitives and emits pixel primitives to the shader engine 140. The shader engine 140 computes, without limitation, pixel color and Z-data, splitting the results between color data 432 and Z-data 431 for further processing. ZROP 120 implements Z-testing and communicates the results to Z-resolve 125, which executes any depth buffer updates. Depending on whether Z-resolve 125 determines that a particular pixel is visible or occluded, CROP 150 saves the related pixel data to the frame buffer 160 or discards the pixel data.

Figure 4B:
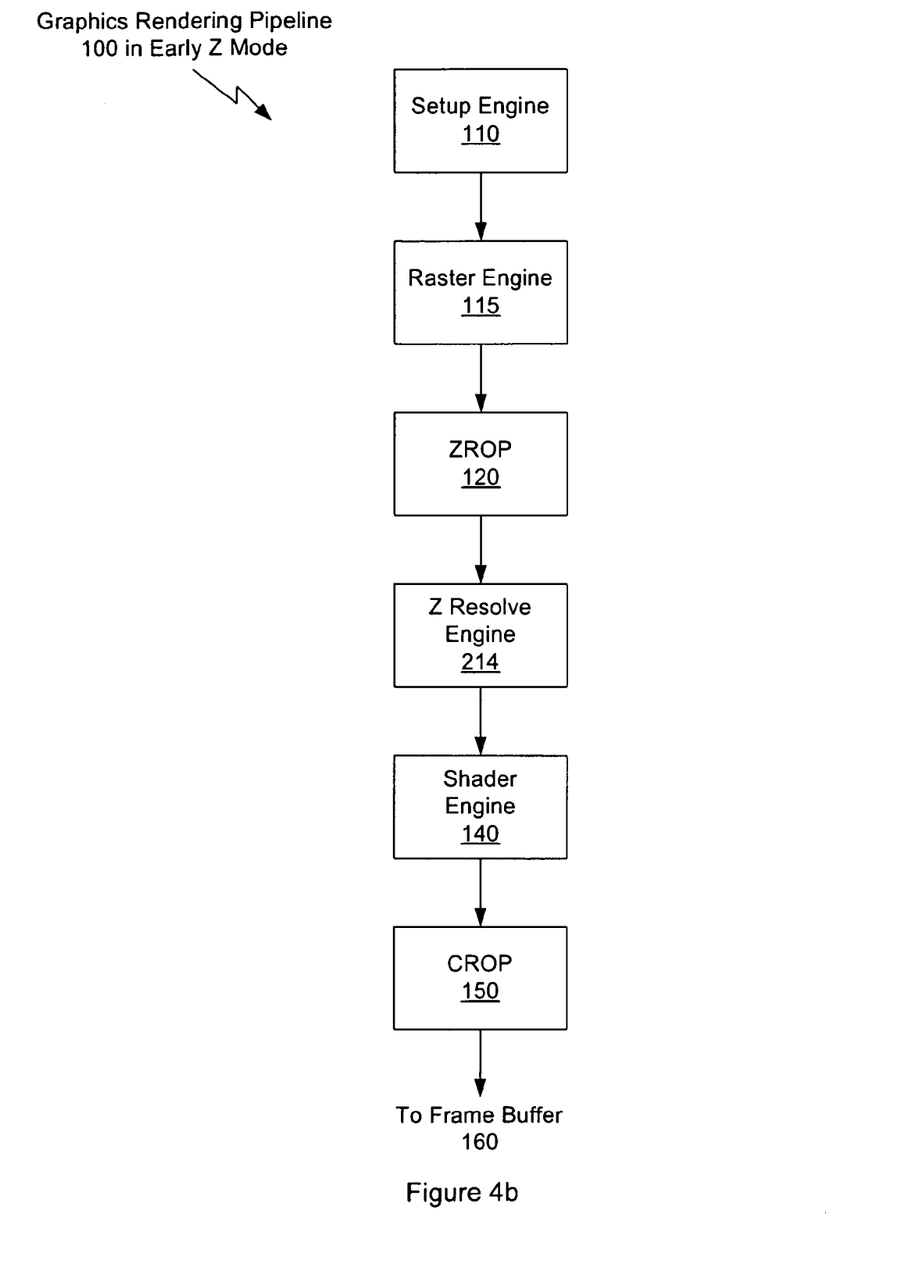
FIG. 4b illustrates the logical configuration of the graphics rendering pipeline of FIG. 1 when operating in early Z-mode, according to one embodiment of the invention.

FIG. 4b illustrates the logical configuration of the graphics rendering pipeline 100 of FIG. 1 when operating in early Z-mode, according to one embodiment of the invention. As with late Z-mode, the setup engine 110 operates on incoming primitives and emits transformed and processed geometric primitives suitable for presentation to the raster engine 115. Unlike late Z-mode, however, the raster engine 115 computes the coverage of geometric primitives and emits the pixel primitives directly to ZROP 120 for Z-testing. ZROP 120 communicates the results to Z-resolve 125, which executes any depth buffer updates. Pixels discarded at this point require no additional processing further down the graphics rendering pipeline 100. The shader engine 140 computes pixel color values, and CROP 150 saves pixel color values to the frame buffer 160.

Flows depicted in FIGS. 4a and 4b result from PROP 130 configuring the data flow through the graphics rendering pipeline 100, as described in FIGS. 1 and 2. PROP 130 is otherwise transparent to the operation of the graphics rendering pipeline 100 in both early Z-mode and late Z-mode and is therefore not shown in FIGS. 4a and 4b.

Figure 5:
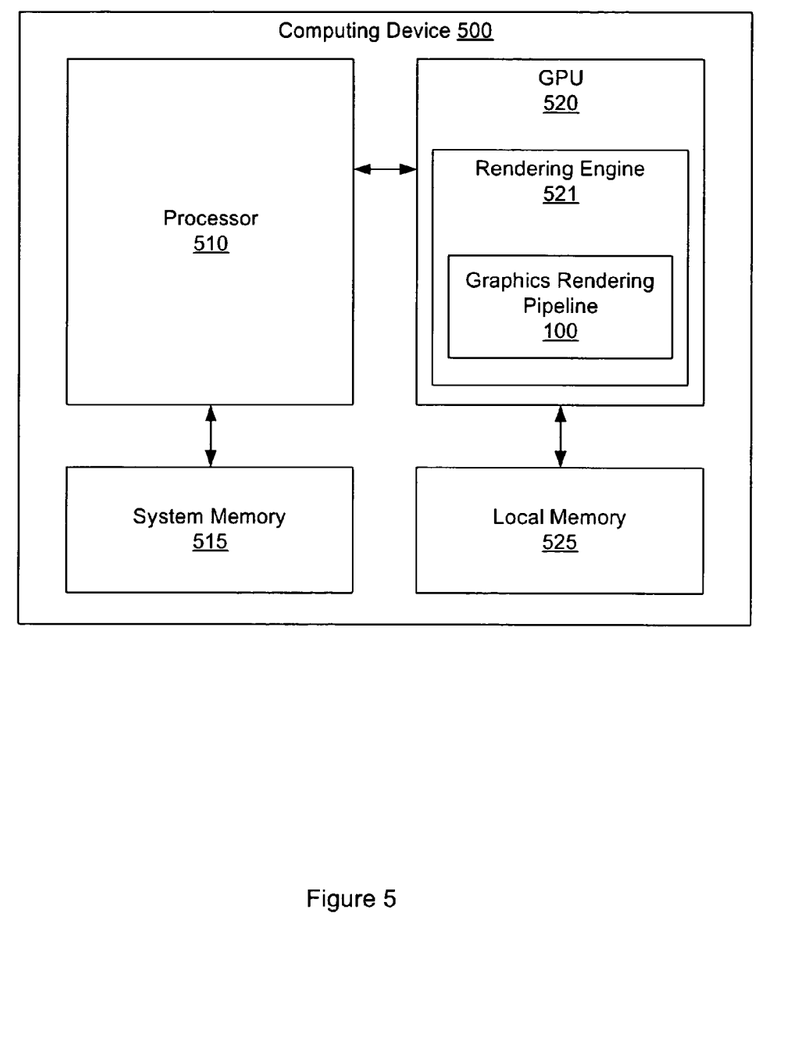
FIG. 5 is a conceptual diagram of a computing device configured to implement one or more aspects of the present invention.

FIG. 5 is a conceptual diagram of a computing device configured to implement one or more aspects of the present invention. The computing device 500 includes, without limitation, a processor 510, system memory 515, a graphics processing unit (GPU) 520 and local memory 525 connected to the GPU 520. The GPU 520 includes at least one rendering engine 521 used to process data. The rendering engine 521 includes at least one graphics rendering pipeline 100 used to process data, as described above.

While the forgoing is directed to embodiments of the present invention, other and further embodiments of the invention may be devised without departing from the basic scope thereof, and the scope thereof is determined by the claims that follow.

We claim:

1. A configurable graphics rendering pipeline for processing graphics primitives, the graphics rendering pipeline comprising:
a setup engine configured to determine whether processing should proceed in early Z-mode or late Z-mode;
a raster engine configured to receive a geometry primitive from the setup engine and convert the geometry primitive into one or more pixel primitives;
a shader engine configured to perform shading operations on one or more samples associated with a pixel primitive;
a Z-raster operations (ZROP) unit configured to perform Z-testing on each of the samples; and
a pre-raster operations (PROP) unit configured to modify, via one or more multiplexers, a data flow path between the shader engine and the ZROP unit to support both early Z-mode and late Z-mode, wherein the PROP unit includes a Z-resolve engine that is configured in both early Z-mode and late Z-mode to discard samples that do not pass the Z-testing performed by the ZROP unit,
wherein the samples associated with the pixel primitive are processed first by the ZROP unit and the Z-resolve engine and then by the shader engine when the graphics rendering pipeline is configured for early Z-mode, and the samples are processed first by the shader engine and then by the ZROP unit and the Z-resolve engine when the graphics rendering pipeline is configured for late Z-mode.

2. The graphics rendering pipeline of claim 1, wherein the setup engine is configured to evaluate a rendering state associated with the geometry primitive to determine whether a change from early Z-mode to late Z-mode or from late Z-mode to early Z-mode should be made.

3. The graphics rendering pipeline of claim 2, wherein the set up engine is configured to execute a flush operation prior to switching from early Z-mode to late Z-mode or from late Z-mode to early Z-mode.

4. The graphics rendering pipeline of claim 3, wherein the setup engine is configured to instruct the PROP unit to modify the data flow path between the shader engine and the ZROP unit to switch from early Z-mode to late Z-mode or from late Z-mode to early Z-mode.

5. The graphics rendering pipeline of claim 1, wherein the setup engine comprising a hysteresis counter that tracks the number of geometry primitives presented to the setup engine since the graphics rendering pipeline was last configured for late Z-mode.

6. The graphics rendering pipeline of claim 1, wherein a hysteresis count is set to a count value, and the hysteresis count is advanced each time the setup engine receives a new geometry primitive while the graphics rendering pipeline is configured for late Z-mode.

7. The graphics rendering pipeline of claim 6, wherein the setup engine is permitted to switch the graphics rendering pipeline configuration to early Z-mode when the hysteresis count equals a trigger value.

8. A computer system configured to process graphics primitives, the computer system comprising:
a memory; and
a processing unit that includes a configurable graphics rendering pipeline having:
a setup engine configured to determine whether processing should proceed in early Z-mode or late Z-mode;
a raster engine configured to receive a geometry primitive from the setup engine and convert the geometry primitive into one or more pixel primitives;
a shader engine configured to perform shading operations on one or more samples associated with a pixel primitive;
a Z-raster operations (ZROP) unit configured to perform Z-testing on each of the samples; and
a pre-raster operations (PROP) unit configured to modify, via one or more multiplexers, a data flow path between the shader engine and the ZROP unit to support both early Z-mode and late Z-mode, wherein the PROP unit includes a Z-resolve engine that is configured in both early Z-mode and late Z-mode to discard samples that do not pass the Z-testing performed by the ZROP unit,
wherein the samples associated with the pixel primitive are processed first by the ZROP unit and the Z-resolve engine and then by the shader engine when the graphics rendering pipeline is configured for early Z-mode, and the samples are processed first by the shader engine and then by the ZROP unit and the Z-resolve engine when the graphics rendering pipeline is configured for late Z-mode.

9. The computing system of claim 8, wherein the setup engine is configured to evaluate a rendering state associated with the geometry primitive to determine whether a change from early Z-mode to late Z-mode or from late Z-mode to early Z-mode should be made.

10. The computing system of claim 9, wherein the set up engine is configured to execute a flush operation prior to switching from early Z-mode to late Z-mode or from late Z-mode to early Z-mode.

11. The computing system of claim 10, wherein the setup engine is configured to instruct the PROP unit to modify the data flow path between the shader engine and the ZROP unit to switch from early Z-mode to late Z-mode or from late Z-mode to early Z-mode.

12. The computing system of claim 8, wherein the setup engine comprises a hysteresis counter that tracks the number of geometry primitives presented to the setup engine since the graphics rendering pipeline was last configured for late Z-mode.

13. The computing system of claim 8, wherein a hysteresis count is set to a count value, and the hysteresis count is advanced each time the setup engine receives a new geometry primitive while the graphics rendering pipeline is configured for late Z-mode.

14. The computing system of claim 13, wherein the setup engine is permitted to switch the graphics rendering pipeline configuration to early Z-mode when the hysteresis count equals a trigger value.

15. A method for switching the configuration of a graphics rendering pipeline between early Z-mode and late Z-mode, the method comprising:
- receiving a geometry primitive;
- determining whether the graphics rendering pipeline is configured for early Z-mode or for late Z-mode;
- determining whether to switch, via one or more multiplexers included in a pre-raster operations (PROP) unit, the configuration of the graphics rendering pipeline from early Z-mode to late Z-mode or from late Z-mode to early Z-mode, wherein the PROP unit further includes a Z-resolve engine that is configured in both early Z-mode and late Z-mode to discard samples that do not pass the Z-testing performed by a Z-raster operations (ZROP) unit; and
- executing a flush operation to complete in-progress work in the graphics rendering pipeline, if the configuration of the graphics rendering pipeline is to be switched.

16. The method of claim 15, further comprising the step of advancing a hysteresis count upon receiving the geometry primitive, if the graphics rendering pipeline is determined to be configured for late Z-mode.

17. The method of claim 16, wherein the step of determining whether to switch the configuration of the graphics rendering pipeline comprises determining whether the hysteresis count is equal to a trigger value, if the graphics rendering pipeline is determined to be configured for late Z-mode.

18. The method of claim 15, further comprising the step of switching, via the one or more multiplexers, the configuration of the graphics rendering pipeline to early Z-mode by modifying a data flow path through the graphics rendering pipeline so that pixel primitives are transmitted to the ZROP unit and the Z-resolve engine before being transmitted to a shader engine.

19. The method of claim 15, wherein the step of determining whether to switch the configuration of the graphics rendering pipeline comprises evaluating a rendering state associated with the geometry primitive.

20. The method of claim 15, wherein the graphics rendering pipeline is configured for early Z-mode, and further comprising the step of switching the configuration to late Z-mode by modifying a data flow path through the graphics rendering pipeline so that pixel primitives are transmitted to a shader engine before being transmitted to the ZROP unit and the Z-resolve engine.

* * * * *